FIG. I

INVENTOR.
MARCUS L. CONRAD
BY Kenneth C. Witt
ATTORNEY

June 2, 1964

M. L. CONRAD 3,135,529

ANTI-BOUNCING VEHICLE

Filed Dec. 29, 1960

INVENTOR.
MARCUS L. CONRAD
BY Kenneth C. Witt
ATTORNEY

June 2, 1964   M. L. CONRAD   3,135,529
ANTI-BOUNCING VEHICLE
Filed Dec. 29, 1960   4 Sheets-Sheet 4

INVENTOR.
MARCUS L. CONRAD
BY Kenneth C. Witt
ATTORNEY

United States Patent Office 3,135,529
Patented June 2, 1964

3,135,529
ANTI-BOUNCING VEHICLE
Marcus L. Conrad, Stevensville, Mich., assignor to Clark Equipment Company, a corporation of Michigan
Filed Dec. 29, 1960, Ser. No. 79,357
4 Claims. (Cl. 280—489)

This invention relates to vehicles having a pivotally mounted, load carrying body portion, and particularly to heavy duty vehicles of the articulated type having a combined draft and steering coupling between the tractor and trailer portions thereof.

The present invention is particularly useful in so-called earthmoving scrapers which commonly take the form of articulated four-wheel vehicles having a combined draft and steering coupling between the tractor and trailer portions of the vehicle and a load carrying body portion pivotally mounted on the trailer portion of the vehicle. However, it will be appreciated that this invention may be applied to other vehicles as well.

Earthmoving scraper vehicles of the type mentioned in the preceding paragraph have been in use for many years and their use is increasing because of their advantages in carrying earth for building highways, dams and other projects involving the movement of large quantities of earth. However, such vehicles have a deficiency which is reflected in two manifestations. The deficiency is that under certain conditions when such vehicles are carrying heavy loads the entire vehicle may go into a rhythmic bouncing action in which the load carrying body portion oscillates up and down and its great weight causes the entire vehicle to be subject to a similar violent bouncing action. One manifestation or result of such action is a very unpleasant ride for the operator of the vehicle. Another is that structural parts of the vehicle, particularly those closely associated with the load carrying body, may be damaged or fail because of the large shock loads imparted thereto by the bouncing of the load carrying body.

The principal object of the present invention is to provide a construction and system for avoiding or at least minimizing such bouncing operation of articulated load carrying vehicles with pivoted body portions.

In carrying out my invention in one preferred form, I provide an articulated scraper type vehicle having a body portion pivoted near the rear of the trailer part of the vehicle, with the front portion of the body supported by means of liquid containing devices suspended from the vehicle frame. The front of the body is thus supported by the pressure exerted on the liquid by the weight of the body. An accumulator is provided, connected to the said liquid supporting device, which permits liquid to flow from the supporting devices into the accumulator temporarily to absorb shocks transmitted by the body when the vehicle encounters uneven terrain. Such liquid preferably is restricted in its return flow to the liquid supporting devices, in order to prevent the occurrence of a resonant condition which might start bouncing action.

To further assist in cushioning the shocks and breaking up the bouncing rhythm, the front or tractor portion of the vehicle also may be equipped with liquid support devices, if desired, between the axle and the frame of the vehicle, these liquid devices likewise being connected to an accumulator. Also, the front portion of the vehicle may be provided with means for restricting or varying the rate of flow of the fluid in and out of the liquid support devices to change the natural frequency of the fluid system and thus aid in breaking up the bouncing rhythm.

For a clearer and more complete understanding of my invention reference should be had to the accompanying drawing in which.

Figure 1:
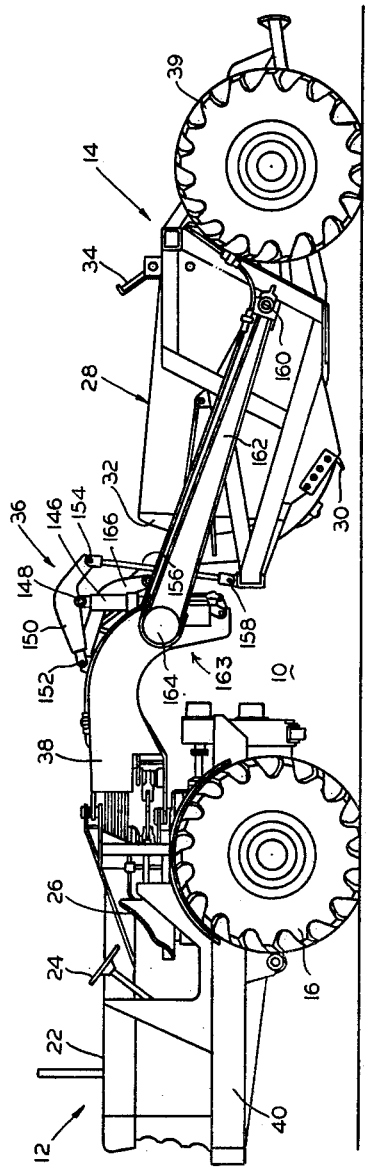
FIGURE 1 is a side elevation of an earthmoving scraper vehicle embodying the present invention.
Figure 2:
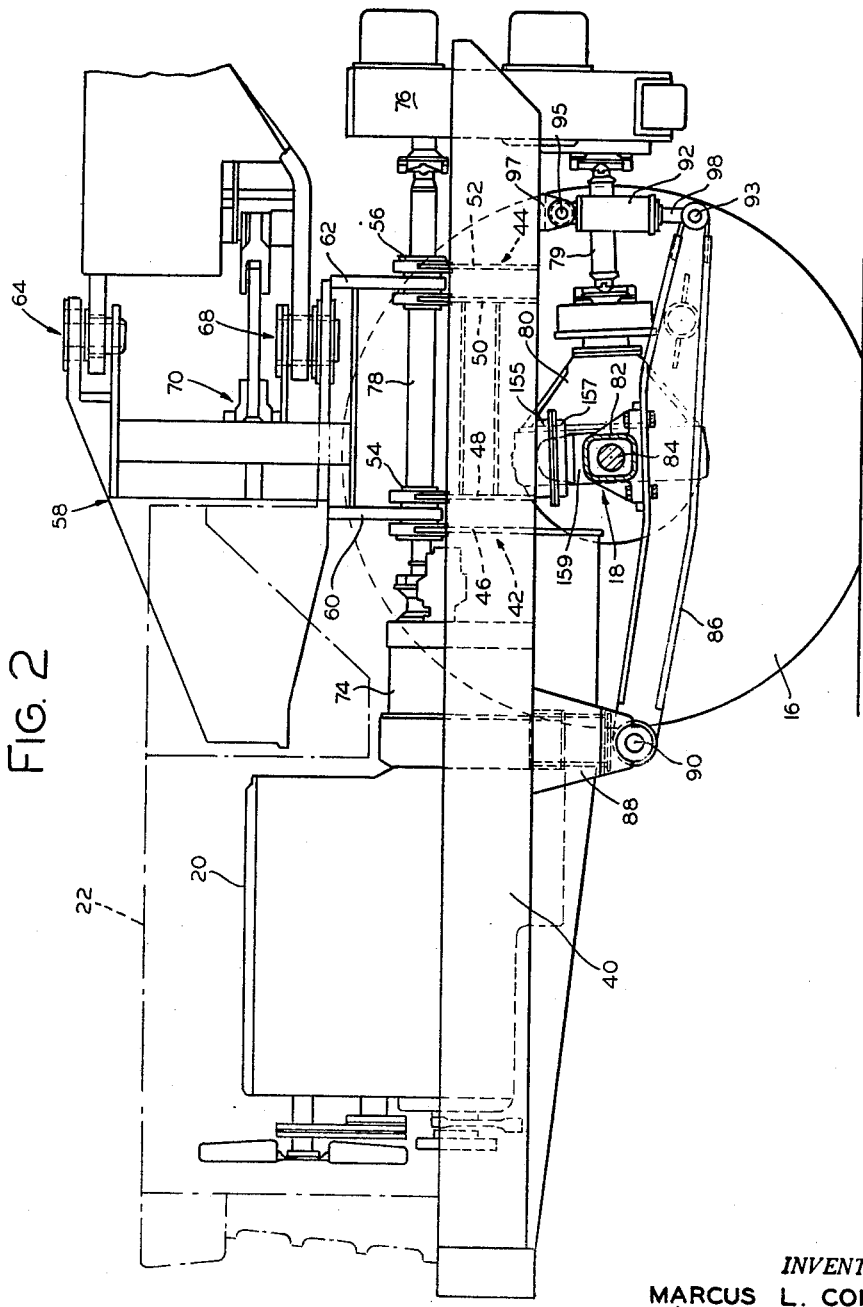
FIGURE 2 is an enlarged side view partially in section of the tractor portion of the vehicle of FIG. 1.

The numeral 10 in FIG. 1 designates generally an articulated vehicle composed of a two-wheeled tractor portion 12 and a two-wheeled trailer portion 14. The tractor portion 12 includes a pair of rubber-tired wheels 16 (see FIGS. 1 and 2) mounted at the outer ends of a transverse axle 18, an engine or other prime mover 20 (see FIG. 2) within enclosure 22, an operator's station including a steering wheel 24 and a seat 26, and other parts described in greater detail hereinafter.

The trailer portion of the vehicle illustrated is in the form of a scraper for loading, transporting and unloading earth, and includes a main body or bowl portion 28 having a cutting edge 30, an apron 32 for closing the front end of the bowl, an ejector mechanism 34, remotely controlled liquid operated means at 36, described more fully hereinafter, for raising and lowering and supporting the front end of the body, and a yoke or a gooseneck portion at 38 for connecting the trailer 14 to the tractor 12. The trailer 14 also includes a pair of rubber-tired wheels 39, only one of which is visible in the drawing, and other parts described in greater detail hereinafter.

The tractor 12 includes a frame portion 40 which comprises a pair of transversely spaced side members (only one of which is visible in the drawing) interconnected by suitable cross-members. These cross-members include a pair of brace portions 42 and 44 each of which is composed of a pair of transverse plate members connected between the two side members of the frame. I have indicated the plates making up the front brace portion 42 by the identifying numerals 46 and 48 respectively while the two plates making up the rear brace portion 42 are indicated by the numerals 50 and 52 respectively. Connected to and supported by the brace portions 42 and 44 are a pair of annular bearing members 54 and 56 respectively.

A coupling structure 58 is pivotally mounted on the tractor 12 by means of a pair of depending members 60 and 62 which have openings therein for receiving bearing members 54 and 56. This arrangement permits the coupling structure 58 to pivot about a longitudinal horizontal axis on the tractor, and it will be understood by those familiar with articulated vehicles of this type that such pivoting action of the tractor coupling structure is desirable to permit the vehicle to negotiate rough terrain. Tractor coupling structure 58 is connected to yoke 38 of the trailer portion of the vehicle by means of spaced pivot connections at 64 and 68 to provide a combined draft and steering connection between the tractor and trailer. The vehicle is steered by turning the tractor with respect to the trailer about the vertically disposed pivot axis through connections 64 and 68 by suitable power operated means connected between the two portions of the vehicle; and a part of the power operated means is visible at 70.

The vehicle 10 illustrated herein is propelled by means of engine 20 forming a portion of tractor 12 and mounted on frame portion 40 thereof forwardly of the axle. The engine 20 operates the vehicle through a torque converter 74 which is connected to a change speed transmission 76 aft of the axle by means of a propeller shaft 78. Shaft 78 extends longitudinally through apertures in bearing members 54 and 56. The output of the transmission 76 is connected by shaft means 79 to a differential mechanism within enclosure 80 which forms a portion of the axle 18 of the tractor. The axle 18 also includes a housing portion 82 which supports the weight of the vehicle, while axle shaft 84 within housing 82 drives the wheel. There is an axle shaft on each side of the differential connected to its respective wheel.

A portion of the tractor structure just described is disclosed and claimed in Patent 2,940,533, dated June 14, 1960 which is assigned to the same assignee as the present application. As pointed out in the said patent, the patented construction, because of its location of the various parts of the tractor at positions which afford the optimum weight distribution, is beneficial in providing a vehicle which is easy to maintain and does not unduly strain the various parts of the machine under various operating conditions. Nevertheless, it has been found that under certain circumstances, particularly when a heavy load is being transported and the terrain is rough, that something more is needed to cut down bouncing of the vehicle with the resulting unpleasantness to the operator and possibility of damage to the vehicle.

In order to aid in solving the bouncing problem, I have provided the vehicle described and illustrated herein with two features which make important contributions in this respect. The fluid circuits for such features are shown schematically in FIG. 3 of the drawing.

Figure 3:
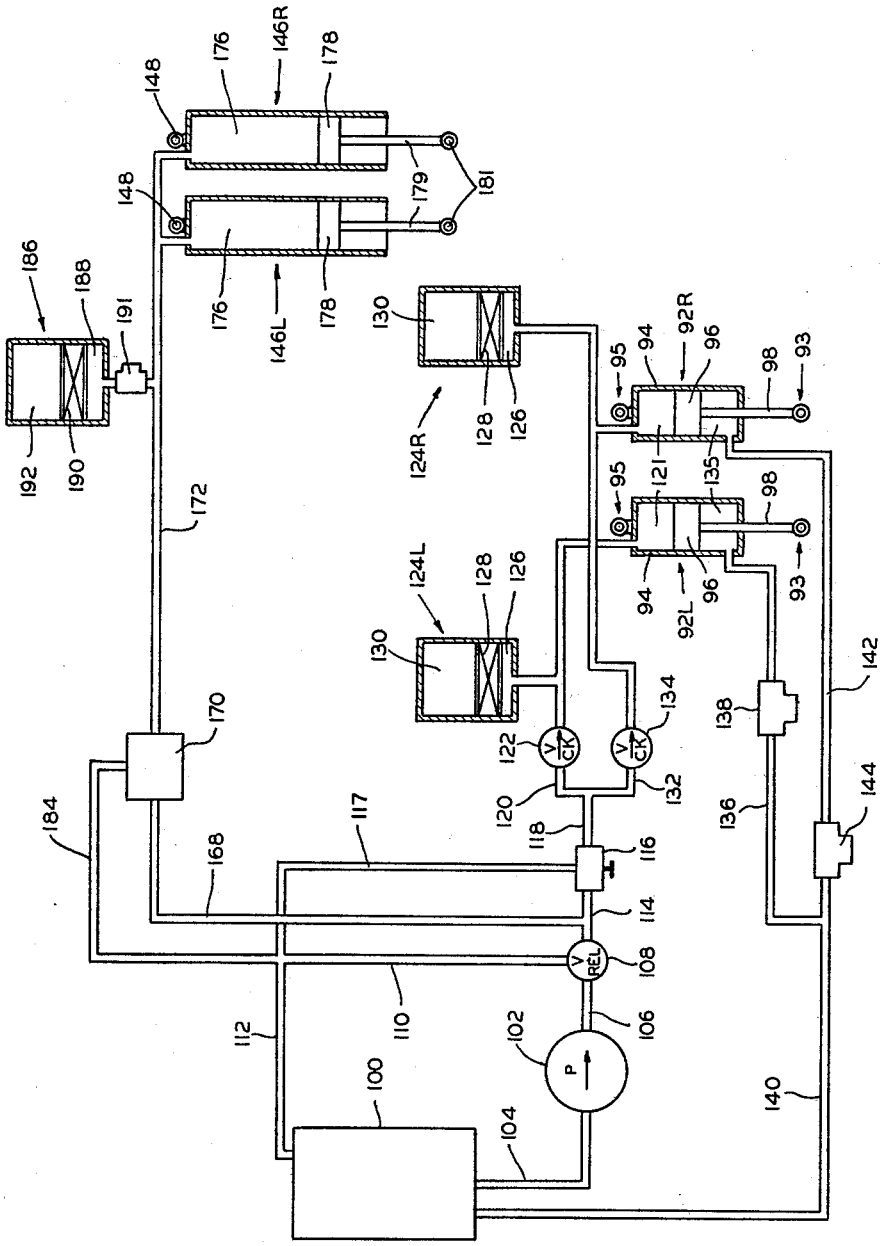
FIGURE 3 is a schematic diagram of the fluid circuit of the invention as embodied in the vehicle of FIGS. 1 and 2.

On the tractor, the axle 18 is connected to the frame portion 40 by means of a structure which includes a pair of levers 86 (only one of which is visible in FIG. 2 of the drawing) one on each side of the tractor. Each lever arm 86 is mounted on the bottom of a longitudinal member of frame portion 40 by means of a depending bracket 88, each lever arm 86 being pivotally connected at 90 to its respective bracket 88. At the rearward end of each lever arm 86 a liquid support device 92 is connected between location 93 on the lever arm and location 95 on another bracket 97 depending from frame 40. Both of the devices 92 are shown in FIG. 3 where they are indicated as 92L and 92R respectively, and each of them comprises an outer cylinder 94 and a piston 96 operating in the cylinder and connected to the end of a piston rod 98.

The devices 92L and 92R are supplied with oil or other suitable liquid from a reservoir 100. A pump 102 which is preferably operated by the engine 20 of the vehicle in a known manner draws liquid from the reservoir through a conduit 104 and discharges fluid under pressure through conduit 106. A relief valve 108 discharges fluid back through conduits 110 and 112 to the reservoir whenever necessary to prevent the liquid pressure from exceeding a predetermined value which may be, for example, 1500 lbs. per sq. in. From valve 108 the pressurized liquid passes through conduit 114 to a pressure regulator mechanism 116 which may, for example maintain the pressure at 500 lbs. per sq. in., with any excess liquid from regulator 116 returning to the reservoir through conduit 117. From regulator 116 the liquid flows through conduit 118 to a branch conduit 120 and thence through a check valve 122 in this branch conduit which permits liquid flow only in the direction described and illustrated in FIG. 3 and not in the opposite direction. Conduit 120 directs the liquid to the top chamber 121 of the liquid device 92L above the piston 96 and also to an accumulator indicated by the numeral 124L which may be of any known type. In FIG. 3, accumulator 124 is shown schematically as a piston-type device with fluid from conduit 120 entering the chamber 126 below a piston member 128. The chamber 130 above the piston 128 is filled with a gas such as nitrogen at the desired pressure which in this case is 500 lbs. per sq. in.

Pressurized liquid also flows from conduit 118 through branch conduit 132 through a check valve 134 therein to chamber 121 of the other liquid support device 92R and also to another accumulator which is indicated by the character 124R and which is a duplicate of accumulator 124L. The parts of accumulator 124R are indicated by the same identifying numerals as the same parts of 124L.

The bottom chambers of the devices 92L and 92R, which are identified by the numeral 135, also contain liquid and are in communication with the reservoir 100 through a conduit 140 and branch conduits 136 and 142. A flow control valve 138 is connected in conduit 136 leading from the chamber 135 of device 92L to conduit 140, while a flow control valve 144 is located in conduit 142.

Referring again to the trailer 14, the liquid operated mechanism 36 includes in the vehicle illustrated a pair of liquid actuator and suspension devices 146 (only one of which is visible in FIG. 1 of the drawing). Each of these devices is connected between the lower portion of the gooseneck 38 and location 148 on a lever 150. The lever 150 is pivoted at location 152 on the gooseneck 38, and at the other end of the lever, connected at 154, is a vertically disposed rod 156 which is connected at 158 to the front of body or bowl structure 28. The rear of body 28 is carried by an axle (not shown) between wheels 39, and the front of the body may move pivotally up and down with respect to the rear axle. The body 28 is also pivotally connected at 160 to the rearward end of an arm structure 162 which is rigidly joined at its front end 164 to a transverse structure which is rigidly connected to yoke 38; it will be understood that there is an arm 162 on each side of body 28. The gooseneck 38, arms 162 and the transverse structure connecting gooseneck 38 and arms 162 form a frame portion which together with frame portion 40 makes up the vehicle frame 163.

Devices 146 may be extended and retracted to raise and lower the lever and rod mechanism 150, 156 thereby to raise and lower the body 28. When it is desired to fill the body with earth the apron 32 is raised by means of a mechanism (not shown in detail) to partially open the front of the body 28, while the devices 146 are retracted to lower the front portion of the body so that the cutting edge 30 thereon engages the ground. Then as the vehicle is moved forwardly earth is forced through the front opening in the body over the cutting edge 30 into the body or bowl portion 28. After the body is filled with earth the apron 32 is lowered again and the front portion of the body is pivoted upwardly by extending devices 146 which causes the body to pivot with respect to the rear axle and with respect to the pivot points 160 at the rearward ends of arms 162.

The liquid circuit for devices 146 is also included in FIG. 3. A conduit 168 leads from conduit 114 to a control valve 170 which in one position admits pressurized fluid to conduit 172 which supplies the two devices 146 which are indicated on FIG. 3 by 146L and 146R respectively. Such liquid enters the top chamber 176 of each device above the piston 178 thereof. Each piston 178 is mounted on a piston rod 179 which, as shown schematically in FIG. 3, is connected at 181 to the gooseneck structure. The entry of liquid under pressure into chamber 176 extends the devices 146L and 146R and produces the raising action of the bowl 28 previously described. The devices 146L and 146R are single-acting and are retracted by the weight of the body 28 expelling liquid through conduit 172. This occurs when the valve 170 is moved to a second operative position interconnecting conduit 172 with discharge conduit 184 which leads back to the reservoir.

During transporting operation, the devices 146L and 146R are in the condition illustrated in FIG. 3 in which there is considerable liquid in chambers 176. These chambers are connected through conduit 172 with accumulator device 186 to which liquid under pressure is admitted to chamber 188 below a piston 190 while the upper chamber 192 contains a gas under pressure.

During movement of loaded vehicle 10 over rough terrain the body portion 28 tends to bounce because of the great weight of the load. This occurs because of the great stress placed on the structural parts such as arms 162 which flexes these parts to a certain extent, and when such flexing action becomes cyclic, rhythmic bouncing occurs. With the present invention, when the momentum of the body 28 is downward the force produced thereby on the liquid in chambers 176 causes liquid to be transferred temporarily from chambers 176 to chamber 188 of accumulator 186, temporarily increasing the pressure of the gas in chamber 192. When the abnormal force is dissipated, however, the gas in chamber 192 forces liquid from chamber 188 back to chambers 176. This operation provides a cushioning action for the front of pivoted body 28 which dampens or attenuates the rhythmic bouncing action.

The liquid suspension devices 92L and 92R on the tractor of the vehicle act in a similar manner. When the momentum of the vehicle structure and load, supported by these devices, is downward liquid is forced from the upper chambers 121 into accumulators 124L and 124R respectively. When this occurs, additional liquid is drawn into lower chambers 135 through conduit 140 and branch conduits 136 and 142. This liquid passes through flow control valves 138 and 144 respectively which limit the flow of liquid to a preselected amount in accordance with the adjusted positions of flow control valves 138 and 144. When the liquid flows from accumulators 124L and 124R back into the chambers 121 upon reversal of the forces on the devices 92L and 92R, the liquid in chambers 135 flows back again through the control devices 138 and 144 to the reservoir 100. By the use of the flow control devices 138 and 144 it is possible to cause the flow of liquid out of and into the devices 92L and 92R on the tractor to be at a different rate than the flow of liquid out of and into the suspension devices 146L and 146R on the trailer of the vehicle, and this further breaks up the rhythmic bouncing which sometimes may occur because of interaction of the tractor and trailer portions of the vehicle. It is possible also to put an adjustable restrictor indicated at 191 in FIG. 3 in the connection between chambers 176 and accumulator 186 so as to be able to vary the rate of liquid flow into and out of suspension devices 146L and 146R on the trailer.

Figure 4:
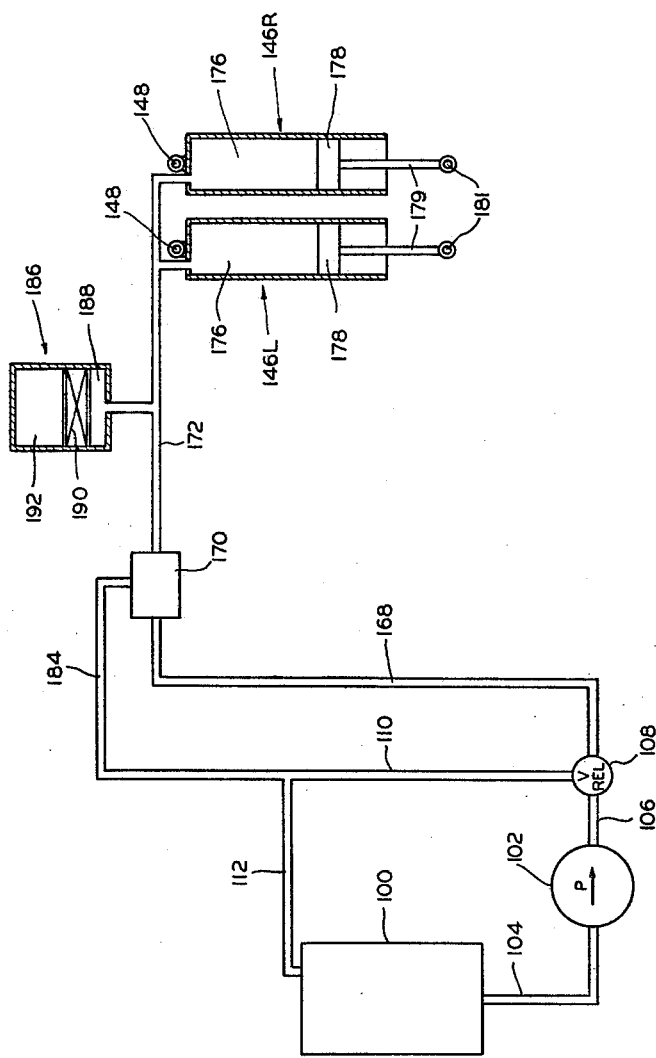
FIGURE 4 is a schematic diagram of the fluid circuit of another embodiment of the invention.

It is possible in some circumstances to omit entirely the liquid suspension devices 92L and 92R from the tractor portion of the vehicle and all of the liquid circuitry and devices associated therewith including the accumulators 124L and 124R. In such circumstances reliance is placed entirely on the suspension devices 146L and 146R on the trailer and the accumulator 186 for providing the necessary cushioning and bounce dampening action, and it has been found that in many circumstances this form of the invention is entirely satisfactory. A schematic diagram of the fluid circuit of this form of the invention is shown in FIG. 4 of the drawing. The parts and devices in FIG. 4 bear the same numbers and operate in the same manner as the same parts and devices in FIG. 3.

While I have described and illustrated herein certain preferred embodiments of my invention it will be apparent to those skilled in the art that modifications may be made. It should be understood, therefore, that I intend to cover by the appended claims all such modifications which fall within the true spirit and scope of my invention.

I claim:

1. In an articulated vehicle having a two-wheeled tractor portion interconnected by a combined steering and draft coupling to a trailer portion including a frame portion and a load carrying body pivotally connected near the rear of the frame portion and extending in horizontally disposed relation relative to the pivot point toward the front of the trailer portion, means including a variable chamber liquid containing device for supporting the front portion of the body on the frame portion, means for admitting liquid to and discharging it from the said variable chamber device for raising and lowering the front of the body, an accumulator, conduit means connecting the said accumulator and the chamber of the said variable chamber device, and a flow control device connected in the said conduit providing for substantially unrestricted flow of liquid from the said chamber to the said accumulator but limiting the rate of flow of liquid from the accumulator to the said chamber to a lower rate, whereby to absorb shock forces transmitted by the said body to the said frame portion and inhibit rhythmic bouncing action of the vehicle.

2. In an articulated vehicle having a frame and rear wheels, a longitudinally extending body portion supported adjacent its rearward end by the said rear wheels, the said body portion being horizontally disposed and pivotally connected intermediate its ends to the said frame, support means connected between the front end of the said body portion and the frame including a liquid-containing device for providing partial support for said body portion on the frame through the pressure exerted on said liquid by the weight of the body portion, and accumulator means providing for a temporary partial discharge of said liquid from and return to the said device to cushion the said body portion and aid in absorbing shocks transmitted by the said body portion to the frame.

3. In an articulated vehicle having a frame and rear wheels, a longitudinally extending body portion supported adjacent its rearward end by the rear wheels, the said body portion being horizontally disposed and pivotally connected intermediate its ends to the frame, means connected between the frame and the front end of said body portion for partially supporting said body portion, said means including a variable chamber liquid containing device, means for admitting liquid to and discharging it from the said chamber of the said liquid device for raising and lowering the said front end of the said body portion with respect to the said pivotal connection, and accumulator means connected to the said chamber providing for temporary partial discharge of liquid from the said chamber to aid in absorbing shock forces transmitted by the said body portion to the said liquid device.

4. In an articulated vehicle having a frame and rear wheels, a longitudinally extending body portion supported adjacent its rear end by the rear wheels, the said body portion being horizontally disposed and pivotally connected to the frame, means connected between the said body portion and the frame for at least partially supporting the said body portion, said means including a variable chamber liquid containing device, means for admitting liquid to and discharging it from the said chamber of the said liquid device for raising and lowering the said body portion with respect to the said pivotal connections, accumulator means connected to said chamber providing for temporary partial discharge of liquid from the said chamber to aid in absorbing shock forces transmitted by the body portion to the said liquid device, and flow control means connected between the said accumulator means and the said chamber providing for the flow of fluid from the accumulator back to the chamber at a slower rate than the flow from the chamber to the accumulator.

References Cited in the file of this patent

UNITED STATES PATENTS

| 2,460,725 | Armington | Feb. 1, 1949 |
| 2,815,223 | Wharton | Dec. 3, 1957 |
| 2,897,613 | Davidson | Aug. 4, 1959 |
| 2,901,051 | Thibodeau | Aug. 25, 1959 |
| 2,902,288 | Dill | Sept. 1, 1959 |
| 2,936,039 | Rockwell | May 10, 1960 |
| 2,940,533 | McAdams | June 14, 1960 |